(12) United States Patent
Allen

(10) Patent No.: US 12,319,377 B1
(45) Date of Patent: Jun. 3, 2025

(54) SINGLE WHEEL VEHICLE RIDER PRESENCE DETECTOR

(71) Applicant: Float Supply, LLC, Sacramento, CA (US)

(72) Inventor: Robert Allen, Sacramento, CA (US)

(73) Assignee: Float Supply, LLC, Sacramento, CA (US)

( * ) Notice: Subject to any disclaimer, the term of this patent is extended or adjusted under 35 U.S.C. 154(b) by 0 days.

(21) Appl. No.: 18/922,954

(22) Filed: Oct. 22, 2024

(51) Int. Cl.
| | |
|---|---|
| *B62J 45/41* | (2020.01) |
| *B62J 25/00* | (2020.01) |
| *B62J 45/42* | (2020.01) |
| *B62K 11/02* | (2006.01) |

(52) U.S. Cl.
CPC ............ *B62J 45/41* (2020.02); *B62J 25/00* (2013.01); *B62J 45/42* (2020.02); *B62K 11/02* (2013.01)

(58) Field of Classification Search
CPC . B62J 45/41; B62J 45/42; B62J 25/00; B62K 11/02
USPC .......................................................... 180/21
See application file for complete search history.

(56) References Cited

U.S. PATENT DOCUMENTS

| | | | | |
|---|---|---|---|---|
| 9,452,345 | B2 * | 9/2016 | Doerksen | A63C 17/01 |
| 9,598,141 | B1 * | 3/2017 | Doerksen | H02K 5/02 |
| 9,717,978 | B2 | 8/2017 | Doerksen et al. | |
| 9,861,877 | B2 | 1/2018 | Doerksen et al. | |
| 9,956,474 | B2 * | 5/2018 | Zhou | A63C 17/12 |
| 9,962,597 | B2 * | 5/2018 | Doerksen | B62K 25/00 |
| 9,999,827 | B2 * | 6/2018 | Wood | A63C 17/12 |
| 10,010,784 | B1 * | 7/2018 | Doerksen | B62D 51/02 |
| 10,143,910 | B2 * | 12/2018 | Doerksen | A63C 17/01 |
| 10,167,036 | B2 * | 1/2019 | Ying | B62D 51/02 |
| 10,207,764 | B2 * | 2/2019 | Li | B62K 11/14 |
| 10,351,206 | B2 * | 7/2019 | Voss | B62K 15/006 |
| 10,376,772 | B1 * | 8/2019 | Doerksen | B62K 25/00 |
| 10,392,075 | B2 * | 8/2019 | Otsuki | B62K 11/007 |
| 10,456,658 | B1 * | 10/2019 | Doerksen | G01C 19/42 |
| 10,682,565 | B1 * | 6/2020 | Woolson | A63C 17/014 |
| 10,913,509 | B2 * | 2/2021 | Liu | B62K 11/007 |
| 10,933,937 | B2 * | 3/2021 | Shang | B62K 11/007 |
| 11,045,712 | B1 * | 6/2021 | Orehek | A63C 17/12 |
| 11,117,474 | B2 * | 9/2021 | Doerksen | B60L 15/20 |
| 11,130,543 | B2 * | 9/2021 | Ying | B62D 51/02 |
| 11,136,084 | B2 * | 10/2021 | Shang | B62J 6/015 |

(Continued)

*Primary Examiner* — James A Shriver, II
*Assistant Examiner* — Hilary L Johns
(74) *Attorney, Agent, or Firm* — Renner, Otto, Boisselle & Sklar, LLP

(57) ABSTRACT

A single wheel vehicle may include first and second footpads. Each footpad may be configured to receive a left or right foot of a rider that is oriented generally perpendicular to a longitudinal axis of the device. A detecting region may be located on the first and second footpads. The detecting region may include switches. Each switch may be electrically connected to corresponding resistor such that the resistance across a powerline drops for each switch that is pressed. A motor controller may receive device orientation information and rider presence information derived from a measurement of the powerline. The motor controller may cause a motor to propel the device based on the device orientation information and the rider presence information, which may correspond to the number of switches pressed. The motor controller may also disengage the motor based on the number of switches pressed.

28 Claims, 12 Drawing Sheets

(56) References Cited

U.S. PATENT DOCUMENTS

| | | | | |
|---|---|---|---|---|
| 11,260,905 | B2* | 3/2022 | Ying | B62D 51/02 |
| 11,273,364 | B1* | 3/2022 | Doerksen | A63C 17/12 |
| 11,590,409 | B2* | 2/2023 | Doerksen | A63C 17/016 |
| 11,890,530 | B2* | 2/2024 | Doerksen | B62K 11/007 |
| 12,059,608 | B2* | 8/2024 | Doerksen | B60L 15/025 |
| 12,161,930 | B2* | 12/2024 | Doerksen | B62K 1/00 |
| 12,187,373 | B1* | 1/2025 | De La Rua | B62J 25/00 |
| 2014/0326525 | A1* | 11/2014 | Doerksen | A63C 17/26 |
| | | | | 180/181 |
| 2016/0121198 | A1* | 5/2016 | Doerksen | B62D 51/02 |
| | | | | 701/22 |
| 2017/0088212 | A1* | 3/2017 | Edney | B60W 40/13 |
| 2017/0120139 | A1* | 5/2017 | Ma | A63C 17/0046 |
| 2017/0361900 | A1* | 12/2017 | Doerksen | B60K 7/0007 |
| 2018/0127047 | A1* | 5/2018 | Lankford | B60L 3/08 |
| 2018/0127048 | A1* | 5/2018 | Li | B62J 45/415 |
| 2018/0140934 | A1* | 5/2018 | Doerksen | A63C 17/08 |
| 2018/0161661 | A1* | 6/2018 | Ma | A63C 17/1418 |
| 2018/0169506 | A1* | 6/2018 | Ma | A63C 17/22 |
| 2018/0251182 | A1* | 9/2018 | Chen | B62K 11/14 |
| 2018/0334214 | A1* | 11/2018 | Cuban | G01G 3/1404 |
| 2019/0168102 | A1* | 6/2019 | Doerksen | B62D 51/02 |
| 2019/0193803 | A1* | 6/2019 | Desberg | B62J 43/16 |
| 2019/0247738 | A1* | 8/2019 | Doerksen | B62K 11/007 |
| 2020/0017155 | A1* | 1/2020 | Hu | G05B 23/0283 |
| 2020/0216128 | A1* | 7/2020 | Doerksen | B62D 37/04 |
| 2020/0254327 | A1* | 8/2020 | Doerksen | A63C 17/08 |
| 2020/0282293 | A1* | 9/2020 | Turner | A63C 17/08 |
| 2021/0380189 | A1* | 12/2021 | Tett | A63F 13/218 |
| 2023/0001286 | A1* | 1/2023 | Doerksen | A63C 17/016 |
| 2023/0285838 | A1* | 9/2023 | Doerksen | B62K 1/00 |
| 2024/0342583 | A1* | 10/2024 | Doerksen | A63C 17/016 |

* cited by examiner

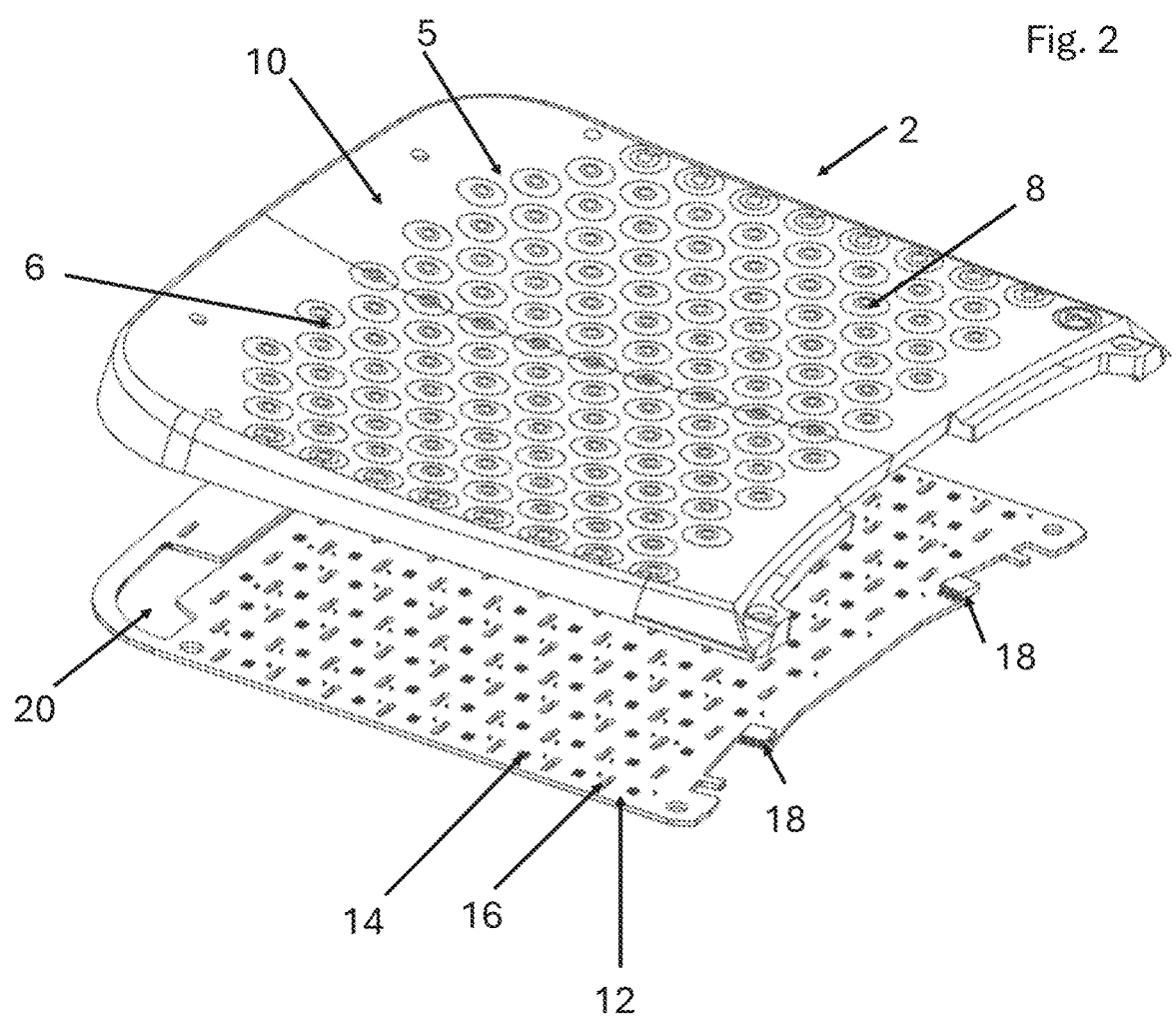

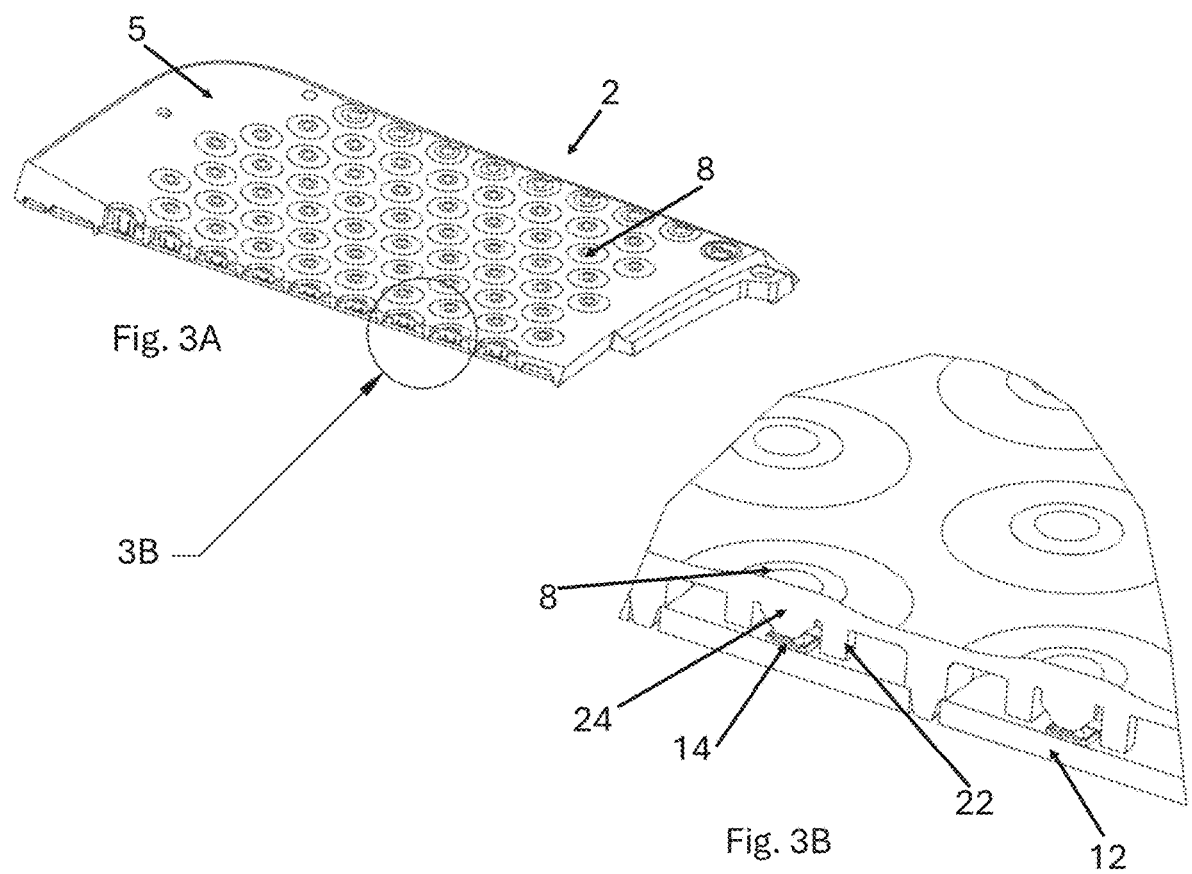

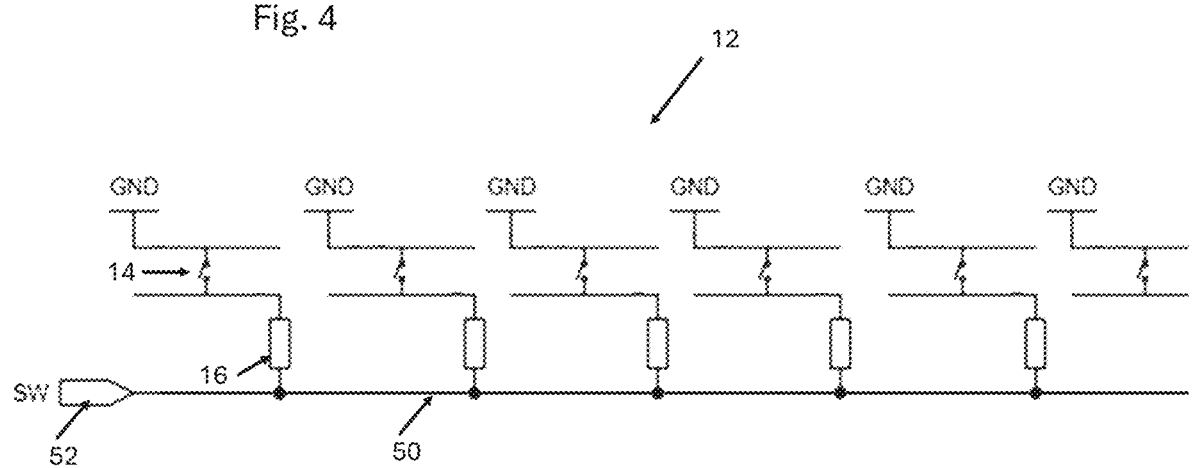

SINGLE WHEEL VEHICLE RIDER PRESENCE DETECTOR

FIELD OF INVENTION

The present invention relates to systems and methods for determining and/or assessing rider presence on a single wheel vehicle, such as a self-balancing device, and engaging or disengaging an electric motor based on the rider presence information.

BACKGROUND

Prior methods of determining and responding to rider presence, such as those disclosed in U.S. Pat. Nos. 9,452,345, 9,717,978, and 9,861,877, sometimes suffer false positives regarding detecting the presence of a rider. A false positive can cause the device to propel itself without a rider present, creating a hazard for people or property in its path. Such a false positive can be caused when a portion of one of the pressure-sensing zones is physically damaged, causing the sensing zone to remain active after a rider dismounts the device. Some current methods cannot distinguish these possible issues from a genuine activation of the sensing areas. In addition, some current methods halt the motor only when no pressure-sensing transducers are pressed, which leaves no margin to account for any false positive readings caused by the issues above.

SUMMARY OF THE INVENTION

As such, there currently exists a need for a rider presence detector that is able to disengage reliably and predictably, even when one or some small number of the individual detecting elements is in a false positive state. The present disclosure relates to a single wheel device rider presence detector that produces an output that is proportional to the area of the detector being activated with high granularity, thus allowing the control system to set a threshold to distinguish between genuine rider presence and a localized partial failure of the detector.

The single wheel device footpad may be part of a device which has a first and a second footpad. Each footpad is configured to receive a left or right foot of a rider oriented generally perpendicular to a longitudinal axis of the device. A first detecting region is disposed in the first and/or second footpads. The first detecting region includes a plurality of resistors wired to a powerline. Each resistor is electrically connected to a switch, such that the resistance across the powerline drops for each switch that is pressed on. The powerline is operatively connected to a main circuit. The main circuit receives information from at least one orientation sensor configured to measure orientation information of the one wheel device. The main circuit may also include a motor controller configured to receive device orientation information measured by an orientation sensor and rider presence information derived from the resistance of the powerline. The motor controller causes the motor to propel or halt the device based on the device orientation information and the rider presence information. The motor controller may be configured with a first and second threshold, each based on the measured powerline resistance corresponding to the number of switches pressed. In one embodiment, the first threshold is less than the second threshold, such that the motor is activated in response to the pressed switches exceeding the second threshold, halted in response to the pressed switches being less than the first threshold, and remaining active in response to the pressed switches being less than the second threshold and greater than or equal to the first threshold.

In one embodiment, the first threshold is greater than zero switches.

In one embodiment, the first threshold is greater than 1 switch and the second threshold is greater than 2 switches.

In one embodiment, the motor controller is further configured to determine the number of switches pressed based on the powerline resistance, arranged such that the number of switches pressed corresponds to the area of the deck portion that is being contacted by the foot of the rider.

In one embodiment, the motor controller may be configured to halt the motor in response to the number of switches pressed being less than a first threshold number regardless of a speed of the device. The first threshold number may be greater than one. The motor controller may be further configured to halt the motor in response to the pressed number of switches being less than the second threshold number when the speed of the device is below a threshold speed. The second threshold number may be greater than 3 and greater than the first threshold number. The motor controller may be further configured to prevent operation of the device if the number of switches pressed is greater than zero when the device is first turned on.

In one embodiment, the footpad includes raised bumps over the switches.

BRIEF DESCRIPTION OF THE DRAWINGS

FIG. 2 illustrates an exemplary footpad.
FIGS. 3A and 3B illustrate views of the exemplary footpad.
FIG. 4 illustrates a circuit schematic of an exemplary footpad.

DETAILED DESCRIPTION

Figure 1:
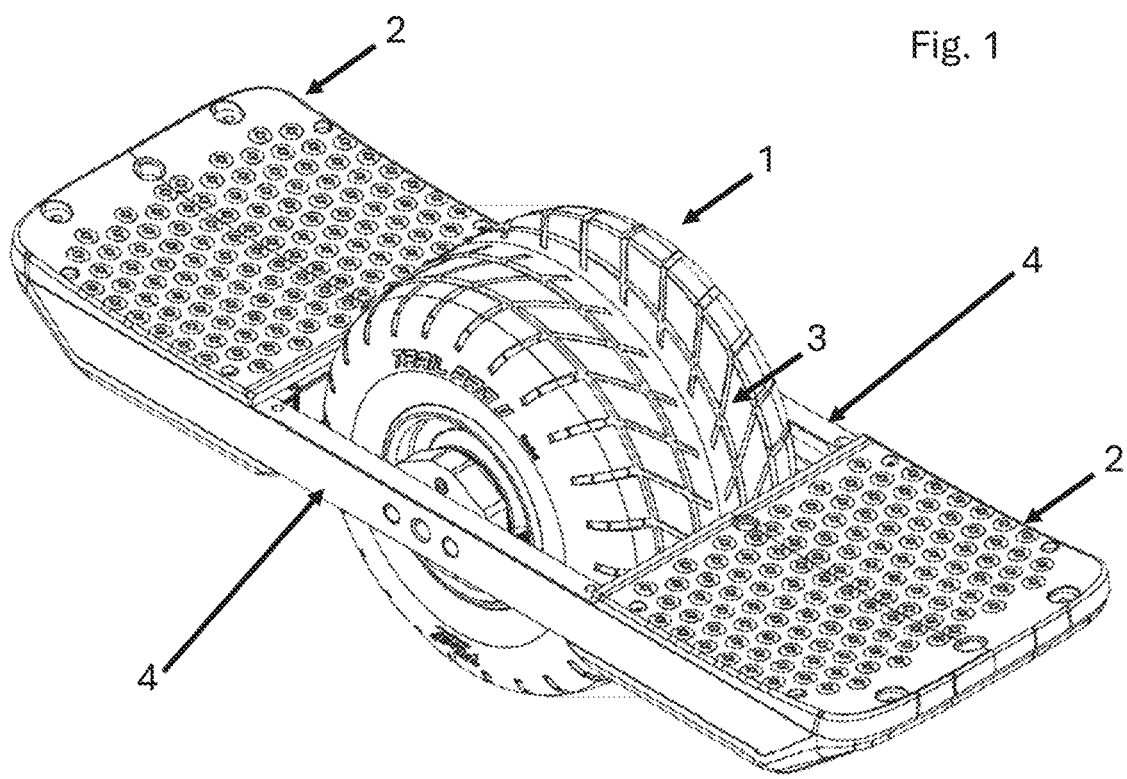
FIG. 1 illustrates an exemplary single wheel device.

FIG. 1 illustrates an exemplary single wheel device 1, a one-wheel vehicle. The device 1 includes two footpads 2, a wheel 3, and a pair of frame rails 4 that connect the two footpads 2 and the wheel 3 together. To operate the device 1, a rider places one foot on each of the footpads 2 and then balances on the device 1 so that the device is level. By leaning and shifting his weight, the rider is able to steer the device 1 to go forward, backward, or turn.

FIGS. 2 and 3 illustrate an exemplary footpad 2. The footpad 2 includes two halves, a toe footpad half 5 and a heel footpad half 6. Raised bumps 8 can be found on the majority of the available space on the footpad 2. An empty space 10 free of any raised bumps 8 may be located at the outer end of the footpad 2. The footpad 2 is disposed above a footpad circuit 12. The footpad circuit 12 includes electronic components such as on/off switches 14, resistors 16, and power connectors 18. The on/off switches 14 function to detect if a person is standing properly on the device. Prior art footpads used force or pressure sensors to determine rider presence on the footpads. These prior art techniques had a propensity to failure in part because such force or pressure sensors may be complex and, thus, generally unreliable. The switches 14 may be simple, yet sturdy on/off switches that increase reliability over prior art techniques.

In FIG. 2, connectors 18 connect the footpad circuit 12 to main circuit 52, shown later in FIG. 4. The footpad 2 may include a vent 20 to allow for pressure equalization in environments with different temperatures. For example, the vent 20 may allow for pressure equalization in cold environments to avoid false activation of the footpad 2 due to the raised bumps contracting downward. As another example, the vent 20 may allow for pressure equalization in hot environments to avoid mechanical separation due to internal pressure increase.

FIG. 3A illustrates the exemplary footpad half 5 and FIG. 3B illustrates a magnified view thereof. The raised bumps 8, when pressed or released, interact with the switches 14 to actuate or disengage. Each raised bump 8 may feature a support 22 that helps absorb force/impact when the raised bump 8 is pressed to generally protect the corresponding switch 14. Each raised bump 8 may include a press portion 24 (also referred to as a pointed portion herein) that may be generally wedge shaped with a flat bottom that engages the corresponding switch 14 to actuate it.

FIG. 4 illustrates an exemplary circuit schematic of the footpad circuit 12. The footpad circuit 12 includes the switches 14. The number of switches 14 is preferably large enough to cover a majority of the footpad 2. In the illustrated embodiment, each switch 14 is connected to ground on one terminal and a resistor 16 on the opposite terminal. Each resistor 16 is connected to a powerline 50. The powerline 50 is connected to the main circuit 52. For each switch 14 pressed, the corresponding resistor 16 is thereby connected to ground, thereby lowering the measurable resistance of the overall circuit at the powerline 50. The resistance of the powerline 50 may be effectively detected by the main circuit 52, where processor 122 (shown later in FIG. 5A) is located. In essence, the processor 122 can determine how many switches 14 are pressed based on the measured resistance or equivalent measurement (e.g., voltage, current, etc.) of the powerline 50. In some embodiments, each footpad 2 may have their own circuit 12, with each powerline 50 being connected to the main circuit 52 such that the processor 122 can determine the number of switches pressed in each footpad individually.

Figure 5A:
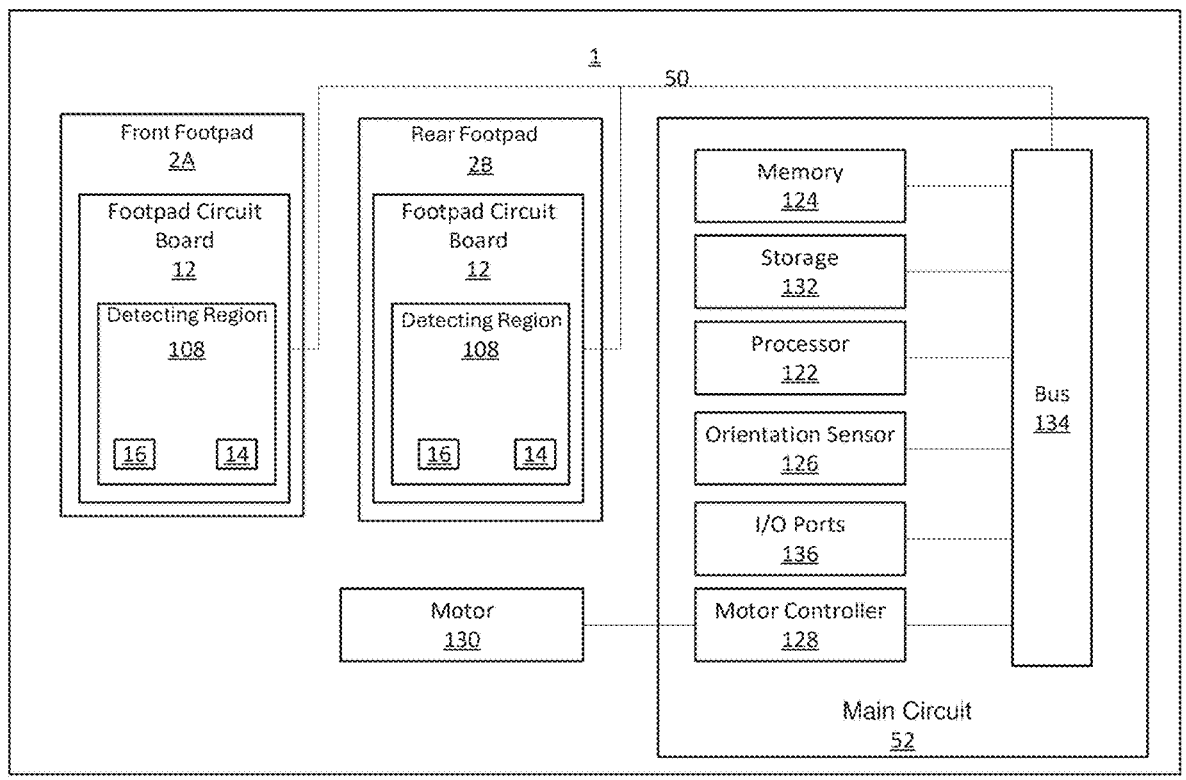
FIG. 5A illustrates a block diagram of an exemplary single wheel device rider presence detector.

FIG. 5A illustrates a block diagram of an exemplary single wheel device 1, which includes two footpads, a front footpad 2A and a rear footpad 2B, located on opposite ends of the device 1. In the illustrated embodiment, each footpad 2A, 2B has a single detecting region 108. Each detecting region 108 includes switches 14 and resistors 16. The area covered by the switches 14 generally makes up the detecting region 108. The detecting region 108 is wired such that, for each additional switch 14 pressed, the resistance across a powerline 50 decreases. This resistance drop is output to a main circuit 52 through the powerline 50 where a processor 122 determines, for example, a resistance or voltage level corresponding to how many switches 14 are currently pressed.

The main circuit 52 may include or may be connected to the processor 122, a memory 124, an orientation sensor 126, a motor controller 128, and a storage 132 operably connected by a bus 134. The orientation sensor 126 measures orientation of the device 1. The orientation sensor 126 may be any sensor that can be used to determine the level of the device 1 with respect to the ground. Some examples may include a gyroscope, an accelerometer, or a combination of the two. If the orientation of the device 1 is determined to be not acceptable, the motor controller 128 will disengage a motor 130 or prevent the motor 130 from engaging. If the device 1 is level, the processor 122 may determine the resistance level of the powerline 50 and, based on this information, the processor 122 may instruct the motor controller 128 to engage or disengage the motor 130.

The processor 122 can be a variety of various processors including dual microprocessor and other multi-processor architectures. The memory 124 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM). The storage 132 may be operably connected to the processor 122 via the bus 134. The storage 132 can include, but is not limited to, devices like a magnetic disk drive, a solid-state disk drive, a flash memory card, or a memory stick. The memory 124 can store processes or data. The storage 132 or memory 124 can store an operating system that controls motor 130 based on the switches 14 pressed.

The bus 134 can be a single internal bus interconnect architecture or other bus or mesh architectures. While a single bus is illustrated, it is to be appreciated that device 1 may communicate with various devices, logics, and peripherals using other buses that are not illustrated (e.g., PCIE, SATA, Infiniband, 1394, USB, Ethernet). The bus 134 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The main circuit 52 may interact with input/output devices via I/O Ports 136. The I/O Ports 136 can include but are not limited to, serial ports, parallel ports, and USB ports that may be used, for example, to program the processor 122, read data from the storage 132, etc.

Figure 5B:
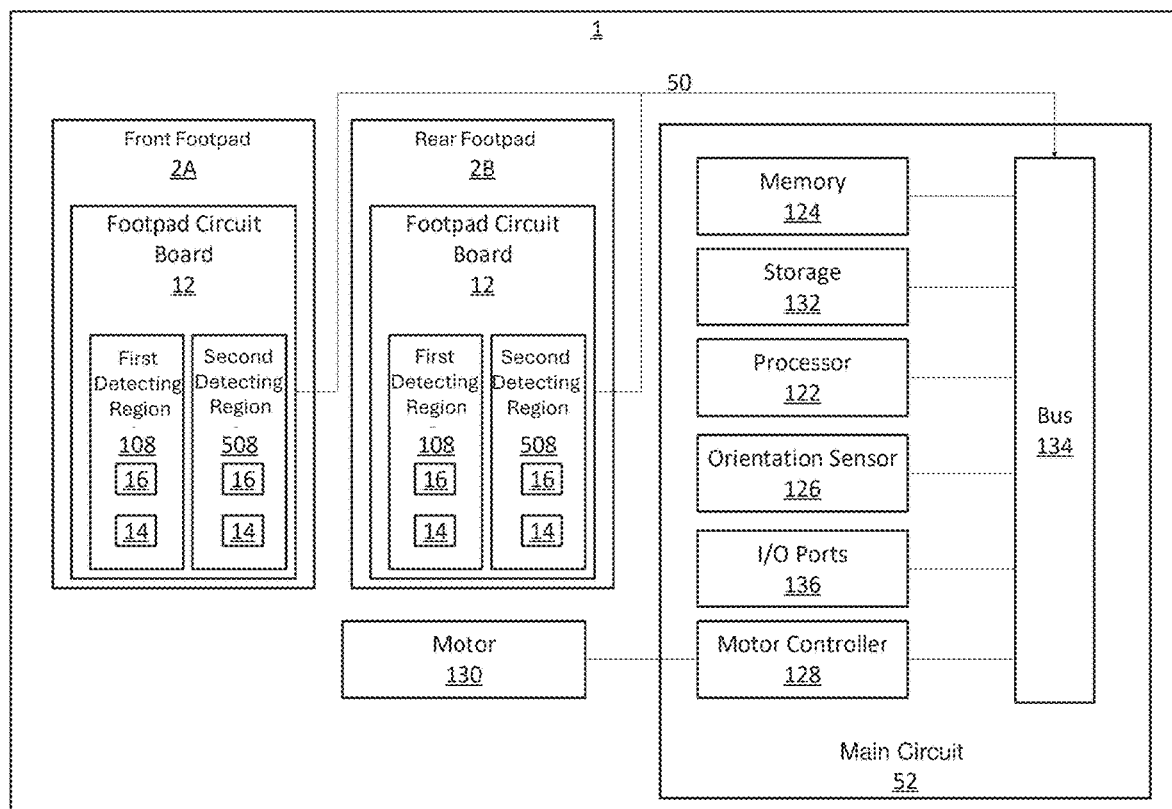
FIG. 5B illustrates a block diagram of a second exemplary single wheel device rider presence detector.

FIG. 5B illustrates a block diagram of a second exemplary single wheel device 1. This second embodiment differs from the first example shown in FIG. 5A by having a first detecting region 108 and a second detecting region 508 in each of the front footpad 2A and rear footpad 2B. The first detecting region 108 may cover a portion (e.g., half) of the footpad 2A or 2B and corresponds to where a rider would place their toes. The second detecting region 508 may cover another portion (e.g., the other half) of the footpad 2A or 2B and corresponds to where a rider would place their heel. This second embodiment performs substantially similar to the first embodiment, except with each foot pad 2A or 2B having two detecting regions 108, 508, the processor 122 performs all steps on each detecting region 108, 508 individually before starting the motor 130. That is, a required number of switches 14 must be pressed on the first and second detecting regions 108, 508 of both footpads 2A and 2B before the motor 130 is engaged.

Figure 6A:
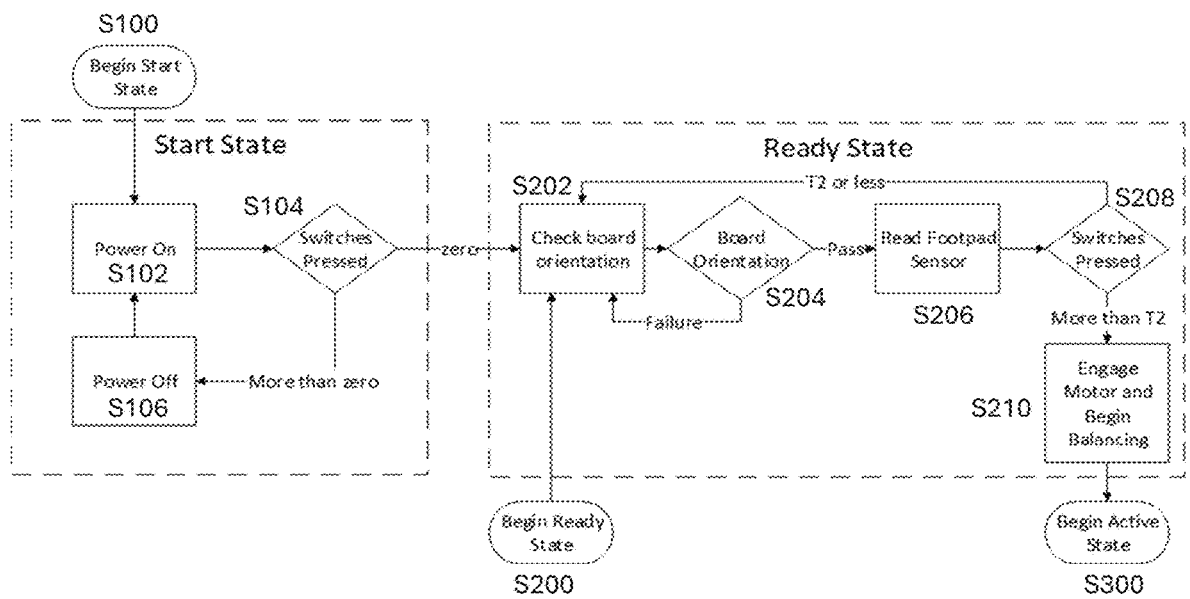
FIG. 6A illustrates two states of a flow diagram for an exemplary a method of using a single wheel device footpad.
Figure 6B:
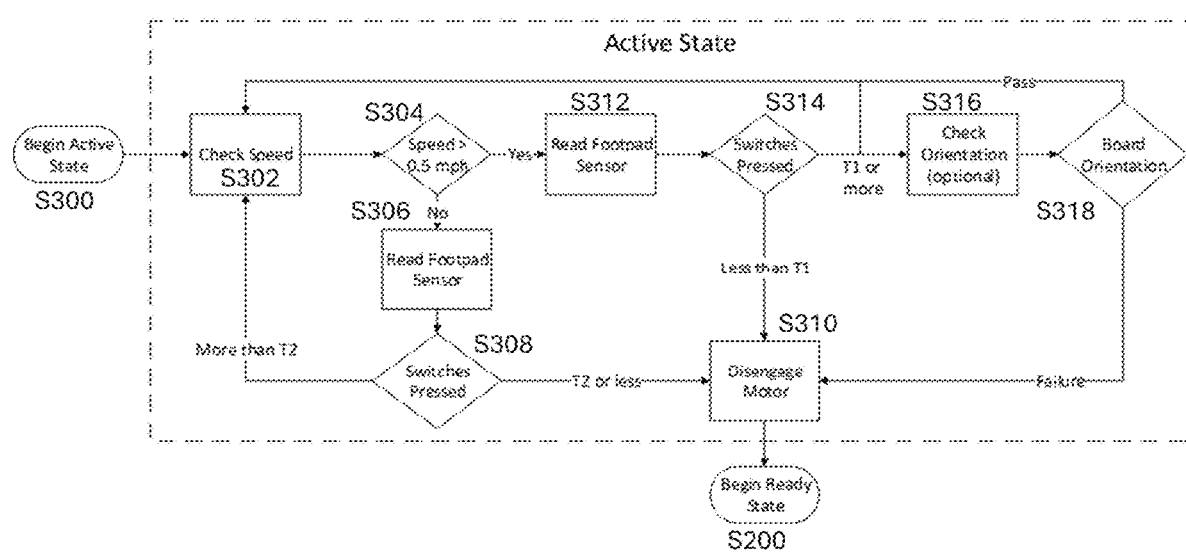
FIG. 6B illustrates a third state of a flow diagram for an exemplary a method of using a single wheel device footpad.
Figure 7A:
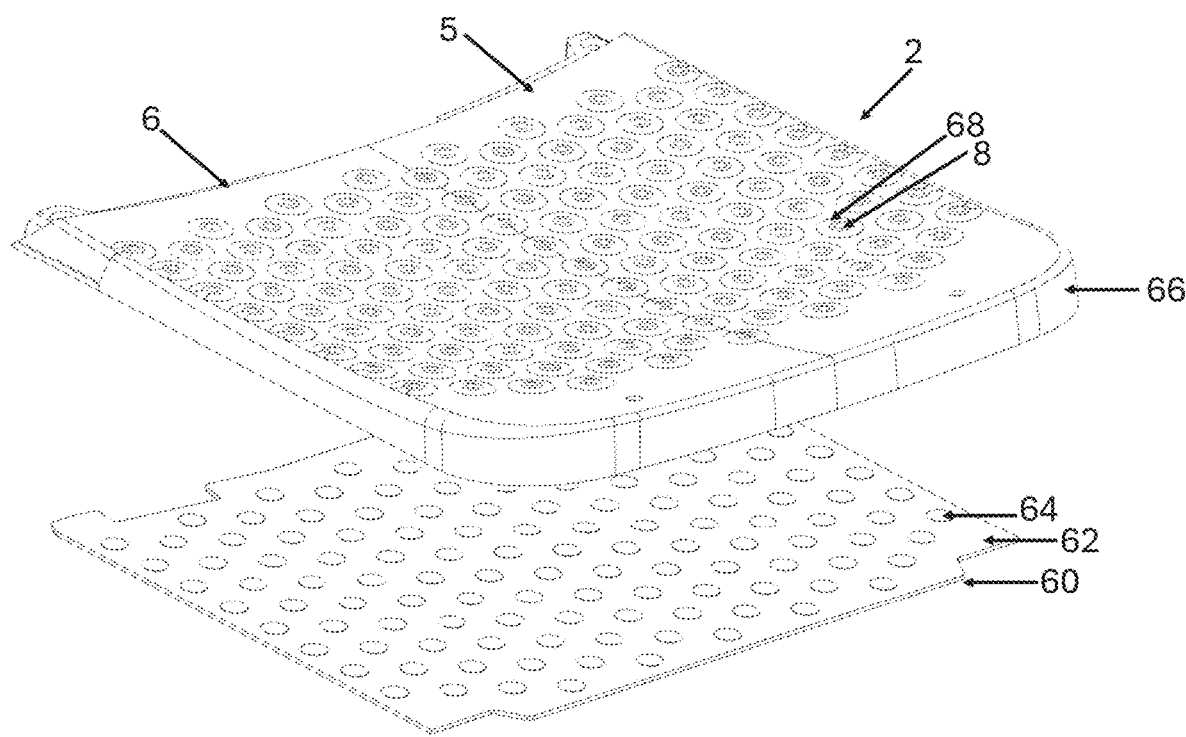
FIG. 7A illustrates a view of an exemplary footpad according to an alternate embodiment.
Figure 7B:
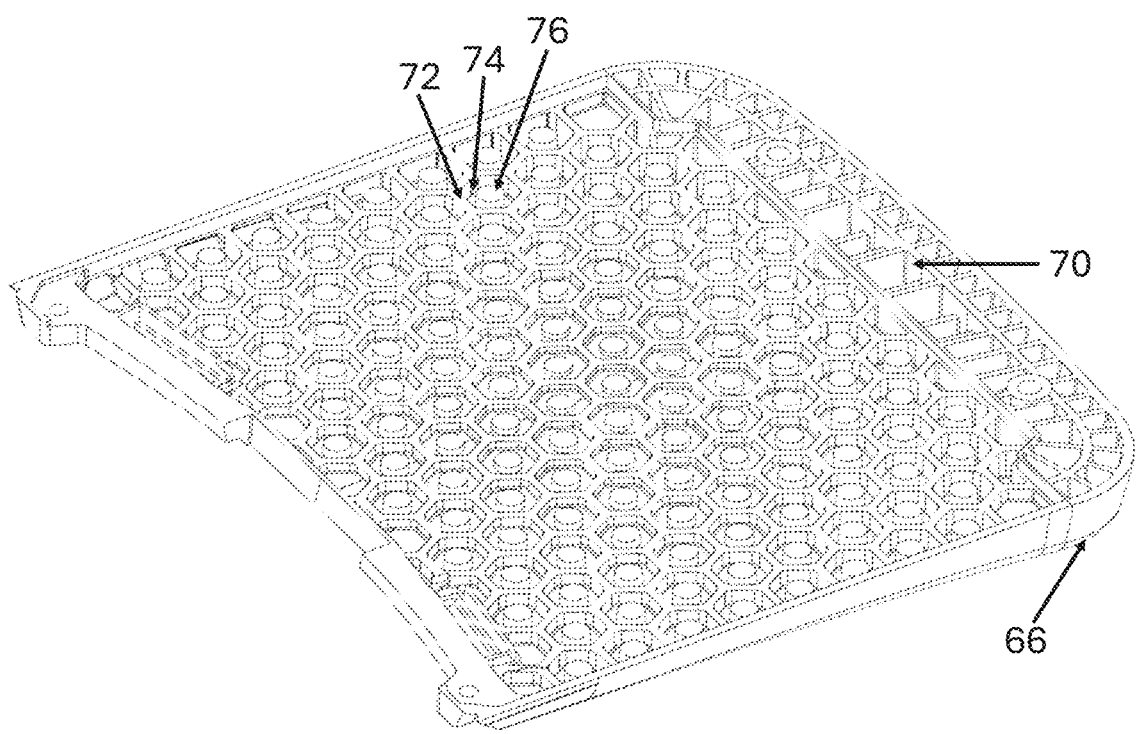
FIG. 7B illustrates an additional view of an exemplary footpad according to an alternate embodiment.

Exemplary methods may be better appreciated with reference to the flow diagram of FIGS. 6A and 6B. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an exemplary methodology. Furthermore, additional methodologies, alternative methodologies, or both can employ additional blocks, not illustrated.

In the flow diagrams, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagrams illustrate functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

FIGS. 6A and 6B illustrate a flow diagram for an exemplary method of using a single wheel device 1 that includes a footpad 2 to control a motor 130.

The method begins at S100, where the device 1 is powered off and the motor 130 is not running. At S102, a user may power on the device 1 by pressing a button. At S104, the processor 122 may determine how many switches 14 are pressed. If the device 1 detects more than zero switches 14 pressed, the device 1 will enter an error state, corresponding to a user prematurely standing on the device 1 when powered on or if switches 14 are malfunctioning. In the event of a malfunction, the issue may be caused by damage to the footpad 2A or 2B, such as dents, causing the switches 14 to be pressed without a rider standing on the footpad. To get the device 1 out of the error state, a user may press a button to power off, shown in S106. A user may then correct the issue and may again try to power the device 1 as shown in S102.

If the processor 122 determines that no switches 14 are pressed at the time of powering on, the device 1 enters a Ready State. While in the Ready State, the device 1 runs through a series of steps before entering an Active State. First, at S202, the processor 122 checks the orientation of the device 1 using the orientation sensor 126, which may be a gyroscope and/or an accelerometer. At S204, the processor 122 determines if the device 1 is level and not currently moving. An acceptable threshold for the orientation of the device 1 is preprogrammed into the processor 122 as an orientation threshold, for example, in degrees relative to the ground. If the orientation of the device 1 is within the expected threshold, the processor 122 may proceed to S206 and begin to read the rider presence detectors 2A and 2B, which may include the detecting region 108 and/or the detecting region 508. If the device 1 is not correctly orientated (e.g., tilted beyond orientation threshold), the device 1 remains in the Ready State and repeats S202 until the orientation readings are satisfactory. This allows a user to start the device 1 in a non-horizontal position and then reorient the device 1 generally horizontal when they are ready to ride. At S208, the processor 122 may determine how many switches 14 are pressed. If the number of switches 14 pressed is less than the activation threshold, the device remains in the Ready State and begins to check the orientation again at S202.

The processor 122 may include two preprogrammed values, a safety (first) threshold (T1) and an activation (second) threshold (T2) number of switches 14. The safety threshold T1 may be greater than zero switches 14. In some embodiments, the safety threshold T1 is greater than one switch 14 being pressed. The safety threshold T1 is intended to prevent the device 1 from starting in the event of a malfunction, such as a switch 14 being stuck pressed down. The activation threshold T2 is a value preprogrammed into the processor 122 to prevent the device 1 from starting accidentally until a set number of switches 14 are pressed. The activation threshold T2 is typically a value significantly (e.g., 10 switches) higher than the safety threshold T1. Prior art methods engaged a motor the moment a footpad sensor was pressed, which led to the device accidentally starting if the footpad sensor malfunctioned or was damaged. The activation threshold T2 may be any value greater than the safety threshold T1. In some embodiments, the activation threshold T2 may be greater than two pressed switches 14. This allows the processor 122 to more accurately determine that both feet of a rider are firmly planted onto the footpad's of the device 1 before proceeding with engaging the motor at S208 to S210.

If the number of switches 14 pressed exceeds the activation threshold T2, S210 occurs and the motor 130 is engaged. The device 1 begins to travel, making it easier for the rider to balance. This begins the next phase, the Active State, which is shown as S300, FIG. 6B.

With the motor 130 engaged, the processor 122 proceeds with S302 where it checks the speed of the device 1. At S304, the processor 122 determines if the speed is above a speed threshold. A possible speed threshold value may be 0.5 miles per hour (mph). If the device 1 is determined to be at or below the speed threshold at S304, the device 1 is considered to be stopped or in the process of stopping. Accordingly, the flow diagram proceeds to S306, where the rider presence detector 108 and/or 508 is read. At S308, the processor 122 determines how many switches 14 are pressed. If more than the activation threshold T2 is still pressed, a user is likely to still be on the device 1 and the process returns to S302 to check speed. The activation threshold T2 is used make sure a larger number of switches 14 are required to be pressed to keep the device 1 engaged at a stop. In this case, the processor 122 returns to S302 and begins to check the speed of the device 1.

If at S308 the processor 122 determines that the number of switches 14 pressed are equal to or below the activation threshold T2, S310 occurs, where the motor 130 is disengaged and the process returns to S200 to begin the ready state. Prior art methods may disengage the motor by the user lifting their heel, which may limit the maneuvers a rider may execute on the device 1, or may present a challenge to new riders who are trying to maintain their balance while dismounting. Based on the logic of the processor 122 in the present disclosure, maneuvers that involve heel disengagement may be possible without motor disengagement as long as a sufficient number of switches 14 remain pressed. On the other hand, based on the logic of the processor 122 in the present disclosure, T2 could be configured to a sufficiently low value to allow a heel lift or other action to disengage the motor, depending on the preference of the user. For example, a rider may roll their foot sideways such that only the outside edge of the foot is contacting the footpad, which may be easier for a user to execute while maintaining balance. A user may have two additional ways of physically disengaging the motor 130. The first is to simply jump off the device 1. By doing so, the number of pressed switches 14 will no longer be above the activation threshold T2, and thus the motor 130 will disengage. The second option to physically disengage the motor 130 while the device 1 is not moving or moving slowly is for the user to first move a foot to the front of the footpad 2A or 2B, to the area where there are no switches 14. For example, the user may move their toes to the outer end of the footpad where there are no switches 14. Then, the user may pivot their foot and lift their heel to no longer be pressing down on any of the switches 14.

Returning to S304, if the device 1 exceeds the speed threshold, the device 1 is considered moving. If in motion, S312 continues with the processor 122 reading the rider presence detector 108 to determine if the rider is still on the device 1. At S314, the processor 122 determines how many switches 14 are pressed. If the processor 122 determines that the switches 14 pressed are less than the safety threshold T1, S310 occurs where the motor 130 disengages. Using a safety threshold T1 while the device 1 is moving allows the motor 130 to stay engaged, with less switches 14 needing to be actively pressed. While the safety threshold T1 is exceeded, the processor 122 will return to S302 and continue to check the speed. In some embodiments, the processor 122 may initiate an additional step, S316, where the device 1 undergoes an additional orientation check. In some embodiments, the processor 122 may then determine if the orientation of the device 1 is within a plausible range for a rider to still be in control, which occurs at S318, pass or failure. If the orientation is within an acceptable range (pass), the processor 122 returns to S302 and checks the speed of the device 1. However, if the orientation is deemed to be unacceptable (failure), such as if the device 1 is flipped upside down or sideways, the processor 122 may move to disengage the motor 130 as shown in S310.

Regardless of what step leads to S310, once the motor 130 is disengaged, the processor 122 returns to the Ready State shown in S200.

Above, aspects of the disclosure were described with reference to an example of a footpad configured to detect the presence of a rider using an arrangement of mechanical on/off switches and resistors. However, the present disclosure is not limited hereto, and alternate embodiments in which the switches are implemented using other detecting mechanisms are also contemplated. Accordingly, an example alternative embodiment will be described below with reference to FIG. 9A and FIG. 9B.

Figure 9A:
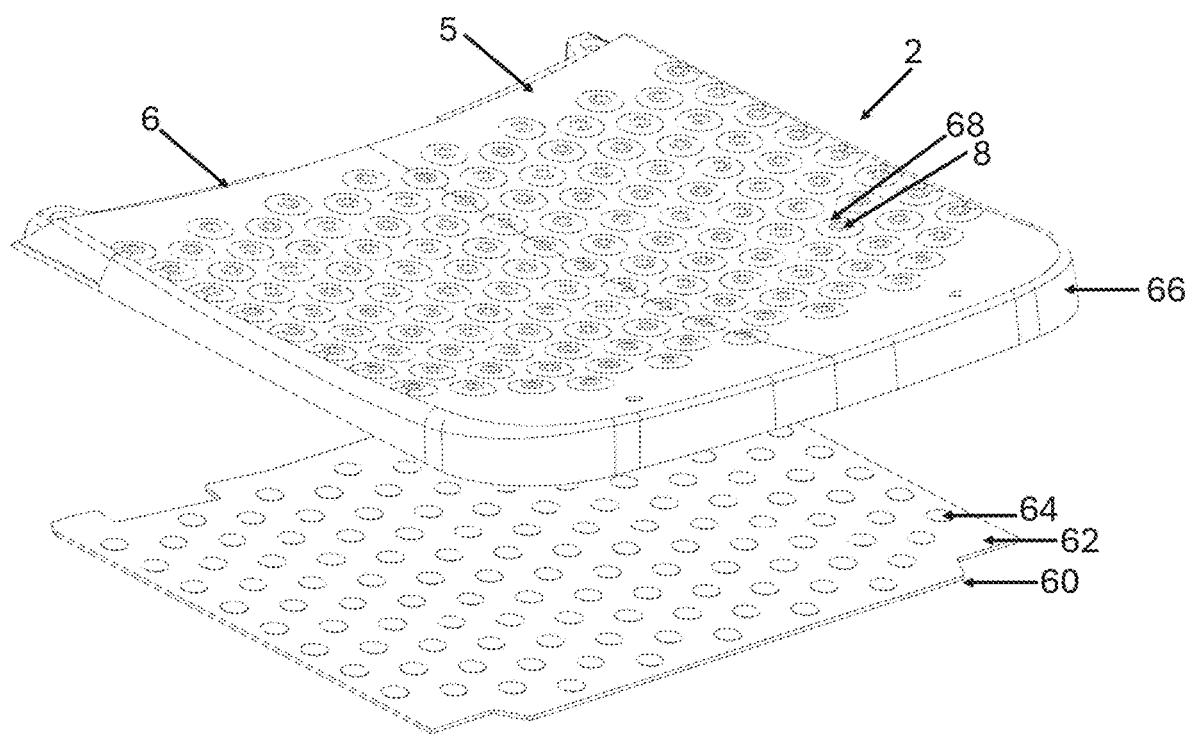
Figure 9B:
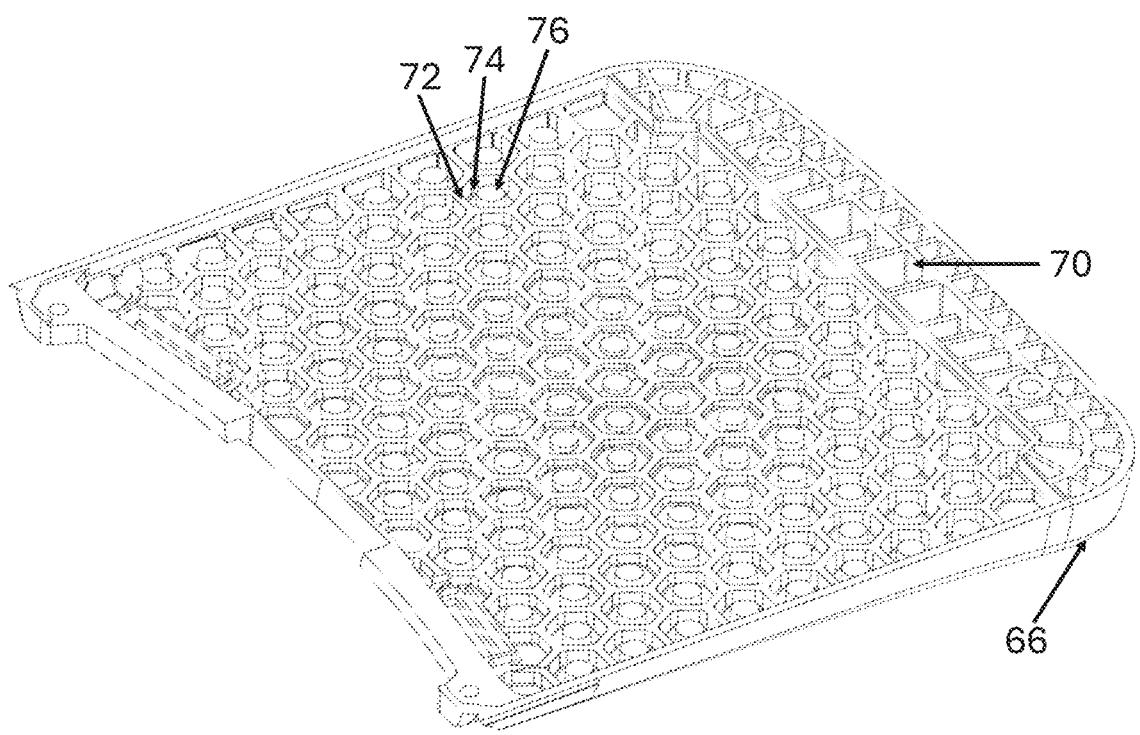

FIGS. 9A and 9B illustrate views of an exemplary footpad 2 according to an alternate embodiment. In the description below, those aspects that differ from previously described embodiments will be primarily described, and redundant description of aspects substantially similar to previous embodiments will be omitted.

As illustrated in FIGS. 9A and 9B, the footpad 2 may include a presence detecting region configured to detect the presence of a rider. The presence detecting region may primarily include a sensor layer 60 (shown in FIG. 9A), a top layer 66 (shown in FIG. 9A) disposed above the sensor layer 60, and a support layer 70 (shown in FIG. 9B) disposed between the sensor layer 60 and the top layer 66. In embodiments, the sensor layer 60, the top layer 66 and the support layer 70 may be formed as separate components configured to be operably connected together. In certain embodiments, one or more of the sensor layer 60, the top layer 66 and the support layer 70 may be integrally formed as a single member. As an example, the support layer 70 may be integrally formed on the underside of the top layer 66.

The sensor layer 60 may include an inactive region 62 and a set of active detecting regions 64 located within the inactive region. The inactive region 62 may serve to isolate (e.g., electrically insulate) each of the set of active detecting regions 64 from one another, such that each active detecting regions 64 serves as a discrete, independent sensing element. In embodiments, the inactive region 62 may be substantially continuous and constitute more than 50% of the total surface area of the top layer of the sensor layer 60. The set of active detecting regions 64 may include discrete sensors or detecting elements configured to detect if a person is standing on the footpad 2. In embodiments, the set of active detecting regions 64 may occupy less than 50% of the total surface area of the top surface of the sensor layer 60. In certain embodiments, the set of active detecting regions 64 may occupy less than 25% of the total surface area of the top surface of the sensor layer 60. The set of active detecting regions 64 may be implemented as membrane-type switches that incorporate a resistive element. For instance, the set of active detecting regions 64 may be implemented using resistive ink to form conductive or semi-conductive areas on a substrate serving as the sensor layer 60. Each of the set of active detecting regions 64 may be insulated from each other by the inactive region 62. The set of active detecting regions 64 may be connected to a powerline 50 (not shown in FIGS. 9A, 9B) that is in turn connected to the main circuit 52 described above to enable measurement for detecting the presence of a rider.

The top layer 66 disposed above the sensor layer 60 may include two halves, a toe footpad half 5 and a heel footpad half 6. The top layer 66 may include a substantially rigid substrate provided with a set of flexible regions 68. A set of raised bumps 8 may be disposed within the set of flexible regions 68. The set of flexible regions 68 and the set of raised bumps 8 may be configured to flex, bend, or otherwise deform downward when a force is applied thereto, and return to their original position when the force is released.

As illustrated in FIG. 9B, the support layer 70 disposed between the sensor layer 60 and the top layer 66 may have a grid structure defining a network of support walls 72 and gaps 74. The support walls 72 may be located substantially above the inactive region 62 of the sensor layer 60, and separate the sensor layer 60 and the top layer 66 in the vertical direction by a predetermined distance. The support walls 72 may define gaps 74 between the set of active detecting regions 64 of the sensor layer 60 and the set of flexible regions 68 of the top layer 66. Here, the gaps 74 refer to the substantially open volume created by the side support walls 72, the sensor layer 60, and the top layer 66. In embodiments, as illustrated in FIG. 9B, the gaps 74 may have the shape of a hexagonal prism, but the shape of the gaps 74 is not particularly limited herein.

Further, as illustrated in FIG. 9B, a set of contact portions 76 may be provided under the set of raised bumps 8 that at least partially protrude into the gaps 74 defined by the grid structure of the support layer 70. The set of contact portions 76 may be formed from an electrically conductive material, and be configured to make contact with the set of active detecting regions 64 of the sensor layer 60 to indicate presence of a rider when the set of raised bumps 8 are pressed down. It should be noted that, as the set of contact portions 76 need not be configured to press down a mechanical switch, the set of contact portions 76 may have a different size and shape than the press portions 24 described in previous embodiments. In certain embodiments, the set of contact portions 76 may have the shape of a cylindrical prism, a rectangular prism, or a hexagonal prism, but the present disclosure is not particularly limited thereto.

When force (e.g., the weight of a rider) is applied to the footpad 5, one or more of the raised bumps 8 in the set of flexible regions 68 on the top surface 66 may flex downward, pushing one or more of the contact portions 76 to protrude downward through the gaps 74 defined in the support layer 70 to come into contact with one or more corresponding active detecting regions 64. Contact between the contact portion 76 and the active detecting region 64 may engage the active detecting region 64 to function as a switch and generate a signal indicating the presence of a rider. More particularly, in the case that the active detecting region 64 is implemented using a resistive element such as resistive ink, contact between the contact portion 76 and the active detecting region 64 may complete an electrical circuit and allow current to flow through the resistive ink. The resistance of the ink influences the amount of current that flows therein, which affects the measurable resistance of the overall circuit at the connected powerline 50. The resistance of the powerline 50 may be effectively detected by the main circuit 52, where processor 122 (described above with reference to FIG. 5A) is located. In this way, the processor 122 can determine how many active detective regions 64 have been activated based on the measured resistance or equivalent measurement (e.g., voltage, current, etc.) of the powerline 50. Further, as described herein, a motor controller 128 may be configured to derive rider presence information from a measurement of the powerline 50 and to cause a motor 130 to propel the single wheel vehicle based at least on the rider presence information.

According to the alternate embodiment described above, it is possible to reliably detect the presence of a rider on the single wheel vehicle using non-mechanical switches. In this way, by using non-mechanical switches (e.g., membrane type switches, resistive ink), the number of moving parts and potential points of failure can be reduced, thereby increasing durability while increasing detection accuracy.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A single wheel vehicle, comprising:
   first and second footpads, wherein each footpad is configured to receive a left or right foot of a rider, the rider oriented generally perpendicular to a longitudinal axis of the single wheel vehicle;
   one or more detecting regions disposed in at least one of the first or second footpads, each detecting region including a plurality of on/off switches, wherein each on/off switch is electrically connected to a respective resistor, such that resistance across a powerline drops for each on/off switch that is pressed on; and
   a motor controller operatively connected to the powerline and configured to receive orientation information of the single wheel vehicle and rider presence information derived from a measurement of the powerline and to cause a motor to propel the single wheel vehicle based on the orientation information and the rider presence information.

2. The single wheel vehicle of claim 1, wherein the motor controller is further configured with a first and second threshold corresponding to the number of switches pressed as determined by the measurement of the powerline, where the first threshold is less than the second threshold, such that the motor is activated in response to the number of switches pressed exceeding the second threshold, to halt in response to the number of switches pressed being less than the first threshold, and to remain active in response to the number of switches pressed being less than the second threshold and greater than or equal to the first threshold.

3. The single wheel vehicle of claim 2, wherein the first threshold is greater than zero.

4. The single wheel vehicle of claim 2, wherein the first threshold is greater than 1 and the second threshold is greater than 2.

5. The single wheel vehicle of claim 1,
   wherein the motor controller is further configured to halt the motor in response to a number of switches pressed as determined by the measurement of the powerline being less than a first threshold number regardless of a speed of the single wheel vehicle, where the first threshold number is greater than one;

wherein the motor controller is further configured to halt the motor in response to the pressed number of switches being less than a second threshold number when the speed of the single wheel vehicle is below a threshold speed, where the second threshold number is greater than 3 and greater than the first threshold number; and wherein the motor controller is further configured to prevent operation of the single wheel vehicle if the number of switches pressed is greater than zero when the single wheel vehicle is first turned on.

6. The single wheel vehicle of claim 1, further comprising: one or more raised bumps on at least one of the first or second footpads, overlapping with the plurality of switches.

7. The single wheel vehicle of claim 6, wherein each of the one or more raised bumps further include one or more support columns protruding underneath the first and second footpads, such that the one or more support columns absorb impact when the corresponding raised bump is pressed.

8. The single wheel vehicle of claim 6, wherein each of the one or more raised bumps further include a pointed portion protruding under the center of the raised bump, such that the pointed portion makes contact with the switch when the corresponding raised bump is pressed.

9. A single wheel vehicle comprising:
first and second footpads, wherein each footpad is configured to receive a left or right foot of a rider oriented generally perpendicular to a longitudinal axis of the single wheel vehicle;
a first detecting region disposed in at least one of the first or second footpads, the first detecting region including a first plurality of switches, wherein each switch in the first plurality is electrically connected to a corresponding resistor, such that resistance across a first powerline drops for each switch in the first plurality that is pressed on;
a second detecting region disposed in at least one of the first or second footpads, the second detecting region including a second plurality of switches, wherein each switch in the second plurality is electrically connected to a corresponding resistor, such that resistance across a second powerline drops for each switch in the second plurality that is pressed on; and
a motor controller operatively connected to the first and the second powerlines and configured to receive orientation information of the single wheel vehicle as measured by an orientation sensor and rider presence information based on one or more measurements of the first and second powerlines and to cause a motor to propel the single wheel vehicle based on the orientation information and the rider presence information.

10. The single wheel vehicle of claim 9, wherein the motor controller is further configured with a first and second threshold based on the number of switches pressed as determined from the measurement of the first and second powerlines, where the first threshold is less than the second threshold, such that the motor is activated in response to the number of switches pressed exceeding the second threshold, to halt in response to the number of switches pressed being less than the first threshold, and to remain active in response to the number of switches pressed being less than the second threshold and greater than or equal to the first threshold.

11. The single wheel vehicle of claim 10, wherein the first threshold is greater than zero.

12. The single wheel vehicle of claim 10, wherein the first threshold is greater than 1 and the second threshold is greater than 2.

13. The single wheel vehicle of claim 9, further comprising
the motor controller being configured to determine the number of switches pressed based on the first and second powerline resistance, arranged such that the number of switches pressed corresponds to the area of the deck portion that is being contacted by the foot of the rider.

14. The single wheel vehicle of claim 9, wherein the motor controller is further configured to halt the motor in response to the number of switches pressed as determined from the measurement of the first and second powerlines being less than a first threshold number regardless of a speed of the single wheel vehicle, where the first threshold number is greater than one; and wherein the motor controller is further configured to halt the motor in response to the number of switches pressed being less than a second threshold number when the speed of the single wheel vehicle is below a threshold speed, where the second threshold number is greater than 3 and greater than the first threshold number; and wherein the motor controller is further configured to prevent operation of the single wheel vehicle if the number of switches pressed is greater than zero when the single wheel vehicle is first turned on.

15. The single wheel vehicle of claim 9, further comprising: one or more raised bumps on the first and second footpads, overlapping with the plurality of switches.

16. The single wheel vehicle of claim 15, wherein each of the one or more raised bumps further include one or more support columns protruding underneath the first and second footpads, such that the one or more support columns absorb impact when the corresponding raised bump is pressed.

17. The single wheel vehicle of claim 15, wherein each of the one or more raised bumps further include a pointed portion protruding under the center of the raised bump, such that the pointed portion makes contact with the switch when the corresponding raised bump is pressed.

18. A single wheel vehicle rider presence detector, comprising:
at least one footpad configured to receive a left or right foot of a rider, the rider oriented generally perpendicular to a longitudinal axis of the single wheel vehicle; and
one or more presence detecting regions disposed in the at least one footpad, each presence detecting region including a plurality of on/off switches, wherein each on/off switch is electrically connected to a respective resistor, such that resistance across a powerline drops for each on/off switch that is pressed on, the powerline configured to be connected to a motor controller configured to derive rider presence information from a measurement of the powerline and to cause a motor to propel the single wheel vehicle based at least on the rider presence information.

19. The single wheel vehicle rider presence detector of claim 18, wherein the one or more presence detecting regions include a first and a second presence detecting region, the first presence detecting region including a first set of the plurality of on/off switches and the second detecting region including a second set of the plurality of on/off switches, wherein the powerline includes a first and a second powerline, the first and the second powerlines configured to connect to a motor controller configured to derive rider presence information based on one or more measurements of the first and second powerlines and to cause a motor to propel the single wheel vehicle based at least on the rider presence information.

20. The single wheel vehicle rider presence detector of claim 18, further comprising: one or more raised bumps on the at least one footpad, overlapping vertically with the plurality of switches.

21. The single wheel vehicle rider presence detector of claim 20, wherein each of the one or more raised bumps further includes one or more support columns protruding underneath the at least one footpad, such that the one or more support columns absorb impact when the corresponding raised bump is pressed.

22. The single wheel vehicle rider presence detector of claim 21, wherein each of the one or more raised bumps further include a pointed portion protruding under the center of the raised bump, such that the pointed portion makes contact with the switch when the corresponding raised bump is pressed.

23. A single wheel vehicle rider presence detector comprising:
at least one footpad configured for installation on a single wheel vehicle and having at least one presence detecting region, the at least one presence detecting region including:
a sensor layer including an inactive region and a set of active detecting regions located within the inactive region;
a top layer disposed above the sensor layer that includes a set of flexible regions provided at locations substantially overlapping the set of active detecting regions in a vertical direction and a set of raised bumps disposed within the set of flexible regions; and
a support layer disposed between the sensor layer and the top layer,
wherein:
the support layer has a grid structure defining:
support walls located above the inactive region that separate the sensor layer and the top layer in the vertical direction, and
gaps between the set of active detecting regions and the set of flexible regions in the vertical direction; and
a set of contact portions are provided under the set of raised bumps that partially protrude into the gaps defined by the grid structure of the support layer, such that the set of contact portions make contact with the set of active detecting regions to indicate presence of a rider when the set of raised bumps are pressed.

24. The single wheel vehicle rider presence detector of claim 23, wherein:
the set of contact portions are formed from an electrically conductive material and the set of active detecting regions include a resistive element, such that resistance across a powerline drops for each active detecting region in contact with a contact portion; and the powerline is configured to be connected to a motor controller configured to derive rider presence information from a measurement of the powerline and to cause a motor to propel the single wheel vehicle based at least on the rider presence information.

25. The single wheel vehicle rider presence detector of claim 23, wherein the set of active detecting regions occupy less than 50% of the surface area of a top surface of the sensor layer.

26. The single wheel vehicle rider presence detector of claim 23, wherein the set of active detecting regions occupy less than 25% of the surface area of a top surface of the sensor layer.

27. A single wheel vehicle, comprising:
first and second footpads, wherein each footpad is configured to receive a left or right foot of a rider, the rider oriented generally perpendicular to a longitudinal axis of the single wheel vehicle;
one or more detecting regions disposed in at least one of the first or second footpads, each detecting region including a plurality of on/off switches, wherein each on/off switch is electrically connected to a respective resistor, such that resistance across a powerline drops for each on/off switch that is pressed on; and
a motor controller operatively connected to the powerline and configured to receive orientation information of the single wheel vehicle and rider presence information derived from a measurement of the powerline and to cause a motor to propel the single wheel vehicle based on the orientation information and the rider presence information;
wherein the motor controller being configured to determine the number of switches pressed based on the powerline resistance, arranged such that the number of switches pressed corresponds to the area of the deck portion that is being contacted by the foot of the rider.

28. A single wheel vehicle rider presence detector, comprising:
at least one footpad configured to receive a left or right foot of a rider, the rider oriented generally perpendicular to a longitudinal axis of the single wheel vehicle; and
one or more presence detecting regions disposed in the at least one footpad, each presence detecting region including a plurality of on/off switches, wherein each on/off switch is electrically connected to a respective resistor, such that resistance across a powerline drops for each on/off switch that is pressed on, the powerline configured to be connected to a motor controller configured to derive rider presence information from a measurement of the powerline and to cause a motor to propel the single wheel vehicle based at least on the rider presence information;
wherein the resistance across the powerline corresponds to an area of the at least one footpad that is being contacted by the rider as the rider stands on the single wheel vehicle.

* * * * *